No. 884,403. PATENTED APR. 14, 1908.
N. W. MILLS.
INSECT TRAP.
APPLICATION FILED JULY 8, 1907.
2 SHEETS—SHEET 2.
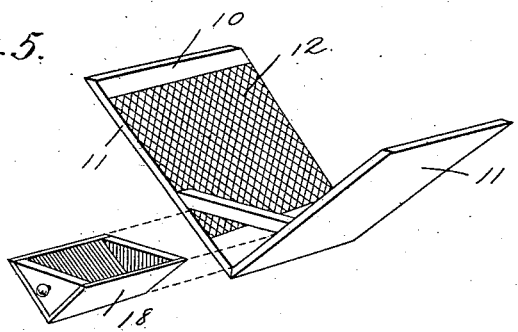
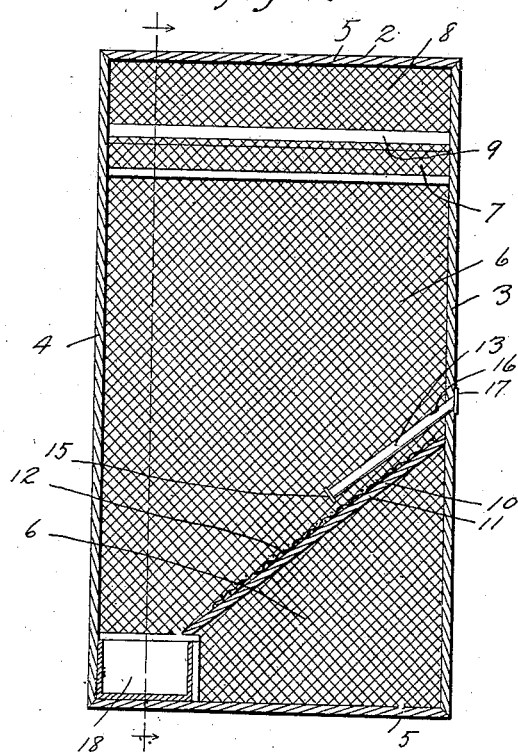
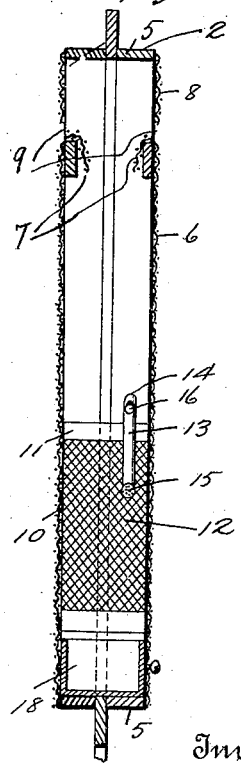
Witnesses
George Hilton
C. H. Giesbauer
Inventor
Norman W. Mills,
by H. B. Willson & Co.
Attorneys

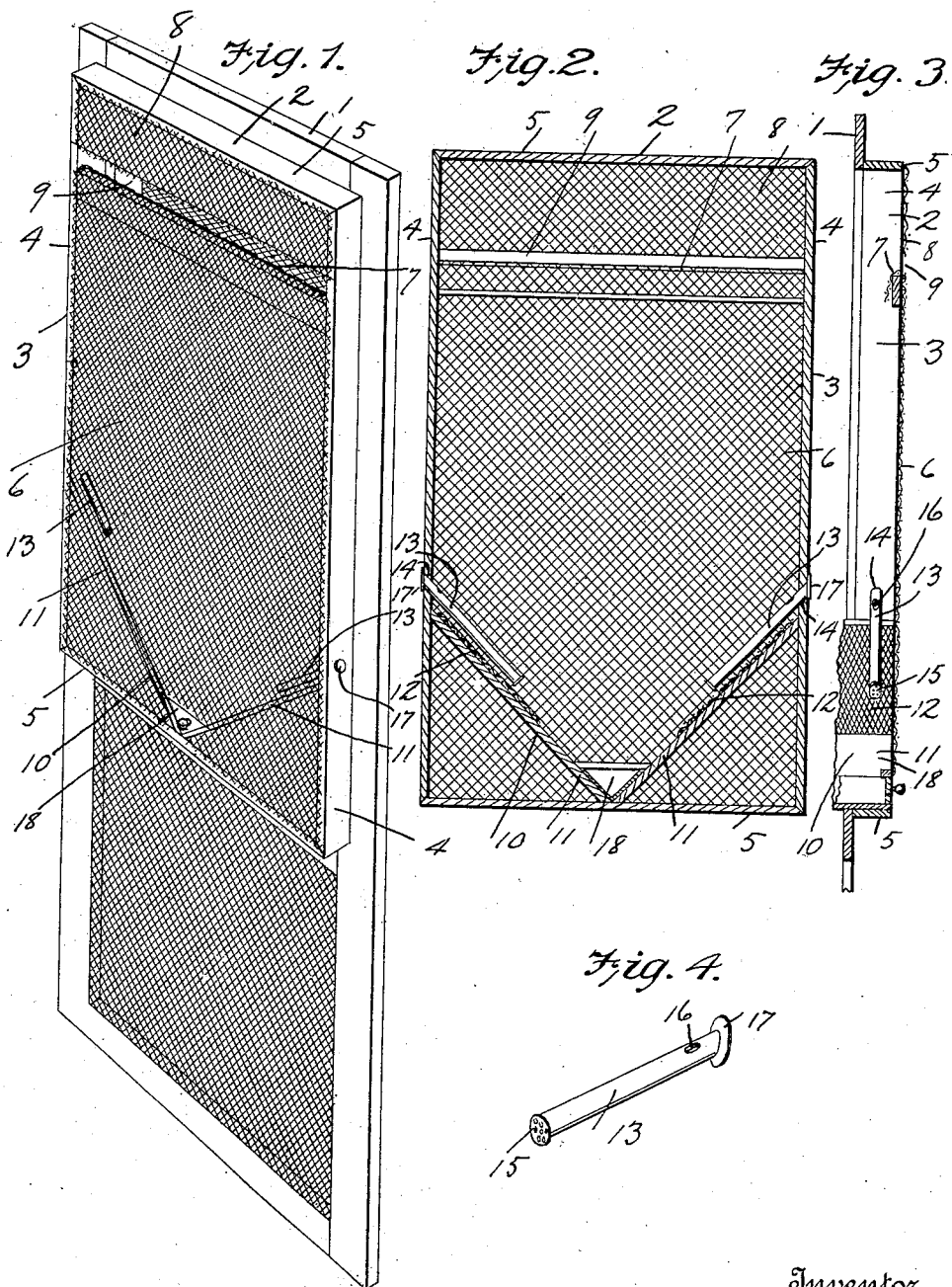

UNITED STATES PATENT OFFICE.

NORMAN W. MILLS, OF BOULDER, COLORADO, ASSIGNOR TO MILLS FLY CATCHING SCREEN COMPANY, OF BOULDER, COLORADO, A CORPORATION OF COLORADO.

INSECT-TRAP.

No. 884,403.           Specification of Letters Patent.           Patented April 14, 1908.

Application filed July 8, 1907. Serial No. 382,694.

*To all whom it may concern:*

Be it known that I, NORMAN W. MILLS, a citizen of the United States, residing at Boulder, in the county of Boulder and State of Colorado, have invented certain new and useful Improvements in Insect-Traps; and I do declare the following to be a full, clear, and exact description of the invention, such as will enable others skilled in the art to which it appertains to make and use the same.

This invention has relation to new and useful improvements in insect traps, and is especially designed as an improvement in the insect trap patented February 19, 1907, No. 844,951.

The object of the invention is to provide a fly trap adapted to be applied to a door or window screen to catch flies or other insects trying to enter the same.

A further object of the invention is to construct a trap of this character which may be applied to a screen door or window and catch flies or other insects attempting to pass either out of or in through the door or window.

With these and other objects in view, the invention consists of certain novel features of construction, combination and arrangement of parts, as will be more fully described and particularly pointed out in the appended claims.

In the accompanying drawings,—Figure 1 is a perspective view of a screen door showing the application of the invention thereto; Fig. 2 is a central vertical cross section of the trap; Fig. 3 is a vertical section taken at right angles to Fig. 2 through one of the trap frames; Fig. 4 is an enlarged detail perspective view of one of the powder tubes; Fig. 5 is a detail perspective view of a chute and insect receptacle adapted to be arranged in the lower end of the trap; Fig. 6 is a cross section of a slightly modified form of trap; Fig. 7 is a vertical section through one of the frames taken at right angles to Fig. 6.

Referring to the drawings for a more particular description of the invention, 1 denotes a screen door or window and 2 the insect trap, which comprises two corresponding open upright frames 3 of suitable size and thickness, adapted to be screwed or otherwise fastened to opposite sides and near the upper end of said door or window. Said frames are of preferably rectangular form, comprising parallel side and end strips or pieces 4 and 5, respectively. Strips 6 of wire netting are fastened over said frames and extend from their lower ends to near their upper or opposite ends, where they are bent or folded inwardly to provide aprons 7. Strips 8 of wire netting are also secured over said frames and extend from their upper ends to within a suitable distance of the upper ends of said strips 6, leaving suitable openings or passages 9 therebetween for the flies or other insects to enter the trap.

A V-shaped chute 10, comprising two pieces or members 11, connected at their inner ends at a suitable angle, is arranged in the lower end of the trap and extends entirely across the frame. Said chute members are preferably provided on their upper faces or sides with strips or pieces 12, of wire netting, the purpose of which will be shown. Powder tubes 13 work through corresponding apertures or openings 14 in the side pieces of said frames 3 and are arranged above and preferably parallel with the free ends of the pieces or members 11 of said V-shaped chute. Said tubes are provided with closed perforated inner ends 15 for the powder to sift through when the door is jarred in swinging to its normal position after having been opened. These tubes are also provided near their outer or opposite ends with suitable openings 16 to enable them to be filled with powder and terminate at their extreme outer ends in outwardly extending shoulders or flanges 17 adapted to engage the outer sides of the side strips or pieces 4 of said upright frames 3, and hold said tubes in position. These shoulders or flanges also enable the tubes to be removed from position with greater facility.

An insect box or receptacle 18 is arranged at the inner or meeting ends of the pieces or members 11 of said V-shaped chute, and extends preferably entirely across the thicknesses of the frames 3 for receiving the dead insects.

In the modified form of the invention, (see Figs. 6 and 7), the chute is made of a single piece of wood, or other material, and extends across said frames 3 at a suitable angle. In this case, the box or receptacle for holding the dead insects is preferably of square form, and is arranged at one of the lower corners of the trap. The purpose of providing the upper faces or sides of the pieces or members 11 of said chute 10 with strips of wire netting is to prevent the powder from falling too freely into the insect box or receptacle when the door or window to which the trap may be applied is jarred by any cause.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having described my invention, what I claim as new and desire to secure by Letters-Patent, is:—

1. In combination with a screen door or window, frames arranged on opposite sides thereof, strips of wire netting arranged over said frames, and extending from their lower ends to near their upper ends, strips of wire netting arranged over said frames and spaced above said first mentioned strips, leaving inlet passages therebetween, a chute arranged below said inlet passages, an insect receptacle arranged on said chute, and powder tubes arranged above said chute.

2. In combination with a screen door or window, two upright frames arranged on opposite sides thereof, strips of wire netting arranged over said frames and bent inwardly near the upper ends thereof to provide inlet passages, a V-shaped chute arranged in said frames and extending entirely across the width and thicknesses of the same, an insect receptacle arranged on said chute, and powder tubes extending through said frames, above and parallel with the ends of said chute.

3. In combination with a screen door or window, an upright open frame arranged on one side thereof, a strip of wire netting arranged over said frame and bent inwardly near the upper end thereof to form a downwardly extending apron, a strip of wire netting arranged above said first-mentioned strip and fastened over said frame leaving an inlet passage therebetween, a V-shaped chute arranged in the frame, an insect receptacle arranged on said chute, strips of wire netting arranged over said chute above the receptacle, and powder tubes extending through said frame above said chute.

4. In combination with a screen door or window, two upright frames arranged on opposite sides thereof, wire netting arranged over said frames and bent inwardly near the upper ends thereof to provide inlet passages, a chute arranged in said frame, an insect receptacle arranged at the end of the chute, and powder tubes extending through the frames above the chute.

5. In combination with a screen door or window, upright frames arranged on opposite sides thereof, strips of wire netting arranged over the frames and bent inwardly near the upper ends thereof to provide inlet passages, a chute arranged in the frames, an insect receptacle arranged in the frames at the lower end of the chute, powder tubes extending through the frames above the chute, and a strip of wire netting arranged over the chute.

In testimony whereof I have hereunto set my hand in presence of two subscribing witnesses.

NORMAN W. MILLS.

Witnesses:
NICHOLAS R. HERIVEL,
ALBERT A. REED.